United States Patent [19]

Olashaw

[11] 3,728,585
[45] Apr. 17, 1973

[54] ELECTRIC SWITCHBOARD ASSEMBLY WITH BUS BAR HEAT PIPE MEANS

[75] Inventor: William F. Olashaw, Plainville, Conn.

[73] Assignee: General Electric Company

[22] Filed: June 12, 1972

[21] Appl. No.: 261,596

[52] U.S. Cl.................317/100, 165/105, 174/16 B, 174/133 B,
[51] Int. Cl.............................H02b 1/20, H01b 7/34
[58] Field of Search...........................317/100, 120; 200/166 K; 174/15 R, 15 BH, 16 B, 129 B, 133 B; 165/105

[56] References Cited

UNITED STATES PATENTS 3,662,137  5/1972  Cleaveland.......................174/15 BH
3,354,261  11/1967  Polgov..............................174/133 B Primary Examiner—Robert K. Schaefer
Assistant Examiner—Gerald P. Tolin
Attorney—Robert T. Casey et al.

[57] ABSTRACT

An electric switchboard assembly, including a main enclosure and a number of vertically extending main power supply busbars and electrical control devices having line terminals connected to the busbars. Heat dissipating means is provided operating on the "heat pipe" principle to dissipate heat generated in the electrical control devices and/or in the connections of such devices. The heat dissipating means operates by transporting the heat to a different location in the switchboard from that in which it is created and dissipating it to suitable heat receiving means such as a circulating heat receiving medium such as air. The vertically extending power supply busbars each comprise a pair of spaced tubular busbar members. The electrical control devices are connected to a first one of the pair of busbars, and the other one of the pair of busbars is provided with heat dissipating means, such as fins. The pair of busbars are spaced apart and are interconnected by tubular members adjacent the top and bottom ends to form a closed loop. This closed loop is evacuated and provided with a liquid and wicking means so that it acts as a heat pipe whereby heat which is transmitted to the first one of the members of the pair of busbars from the electrical control devices or by the flow of current therethrough is carried to the other member of the pair and dissipated to the circulating air around the fins.

7 Claims, 7 Drawing Figures

ELECTRIC SWITCHBOARD ASSEMBLY WITH BUS BAR HEAT PIPE MEANS

BACKGROUND OF THE INVENTION

One of the major problems involved in the design of the electrical switchboard assemblies relates to the dissipation of heat generated in the assembly. Heat is generated in electrical control devices mounted in the switchboard assembly and connected to the power supply busbars. Heat is also generated at the connecting points which connect the control devices to the busbars (both incoming and outgoing), and heat is generated in the busbars themselves by current flowing through them. The most effective available means for disposing of such heat heretofore has been the circulation of air around these parts. Thus switchboards have been designed to include vent openings in the walls at the lower portions and openings at the upper portions or top to permit circulation of air vertically through the switchboard. While forced circulation has been used, this is not a generally acceptable measure because of the cost and space required for ventilating fans and because of the possibility of failure of such fans. The circulation of air, however, has been of only limited effectiveness since many of the above mentioned parts where heat is generated are not located where air can effectively circulate around them, and where it is difficult or impossible to enhance the dissipation of heat to the air by suitable means such as by use of fins, etc.

Accordingly, it has been necessary to increase the size of current carrying parts, and also to use larger metal parts in close contact with current carrying parts to act as heat sinks.

OBJECTS OF THE INVENTION

It is an object of the present invention to provide an electric switchboard assembly including highly effective means for dissipating heat generated in the switchboard, including heat generated in control devices, connecting points, and busbars.

It is a further object of the invention to provide a switchboard assembly of the type described which does not require more space than prior art switchboards not having such heat dissipating means.

It is a further object of the invention to provide a switchboard of the type described which is not significantly more expensive than prior art switchboards without such heat dissipating means.

A further object of the invention is to provide a switchboard of the type described which is capable of accepting standard prior art type electrical control devices, whether by plug-in or by bold-in connecting means.

It is a further object of the invention to provide a switchboard of the type described which includes heat dissipating means which is relatively simple, effective, and inexpensive.

It is a further object of the invention to provide an electrical switchboard utilizing heat transporting means of the heat type for transporting heat from a first location where it is generated to a second location where it can be effectively dissipated.

It is a more particular object of the invention to provide an electric switchboard in which the power-conducting bus bars are adapted to serve as "heat pipes" to carry heat from high-temperature locations in the switchboard to other parts of the switchboard where it is dissipated to the naturally circulating air.

SUMMARY OF THE INVENTION

In accordance with the invention in one form, an electric switchboard assembly is provided including a main outer enclosure and power supply busbars in the enclosure, means for receiving electrical control devices for connection to the power supply busbars, and means for making outgoing or load terminal connections to the electrical control devices. At least some of the busbars are arranged to extend vertically and include hollow tubular portions which are constructed to form a part of a closed loop which is tubular throughout and which operates on the "heat pipe" principle. Accordingly, the closed loop includes a first heat-receiving or "evaporating" portion, and a second portion spaced from the first portion which is a heat dissipating or "condensing" portion. In one aspect of the invention, the evaporating portion of the closed loop includes portions for making connection with electrical control devices. Accordingly, heat generated in the electrical control devices or in the connections between the electrical control devices and the busbars, or in the busbars themselves, causes evaporation of a liquid contained in the closed tubular loop. The evaporation of liquid creates a vapor which expands and fills the remaining portion of the loop where it comes in contact with relatively low temperature portions of the loop and is recondensed, giving up heat. In addition, heat dissipating means, such as fins, are provided in good thermal conducting relation to the condensing portion to enhance the dissipation of heat from the condensing portion to a heat receiving medium. In accordance with the invention in one form, the heat receiving medium is the naturally circulating air which moves in a vertically extending chamber in the switchboard.

DETAILED DESCRIPTION OF A PREFERRED EMBODIMENT

Figure 1:
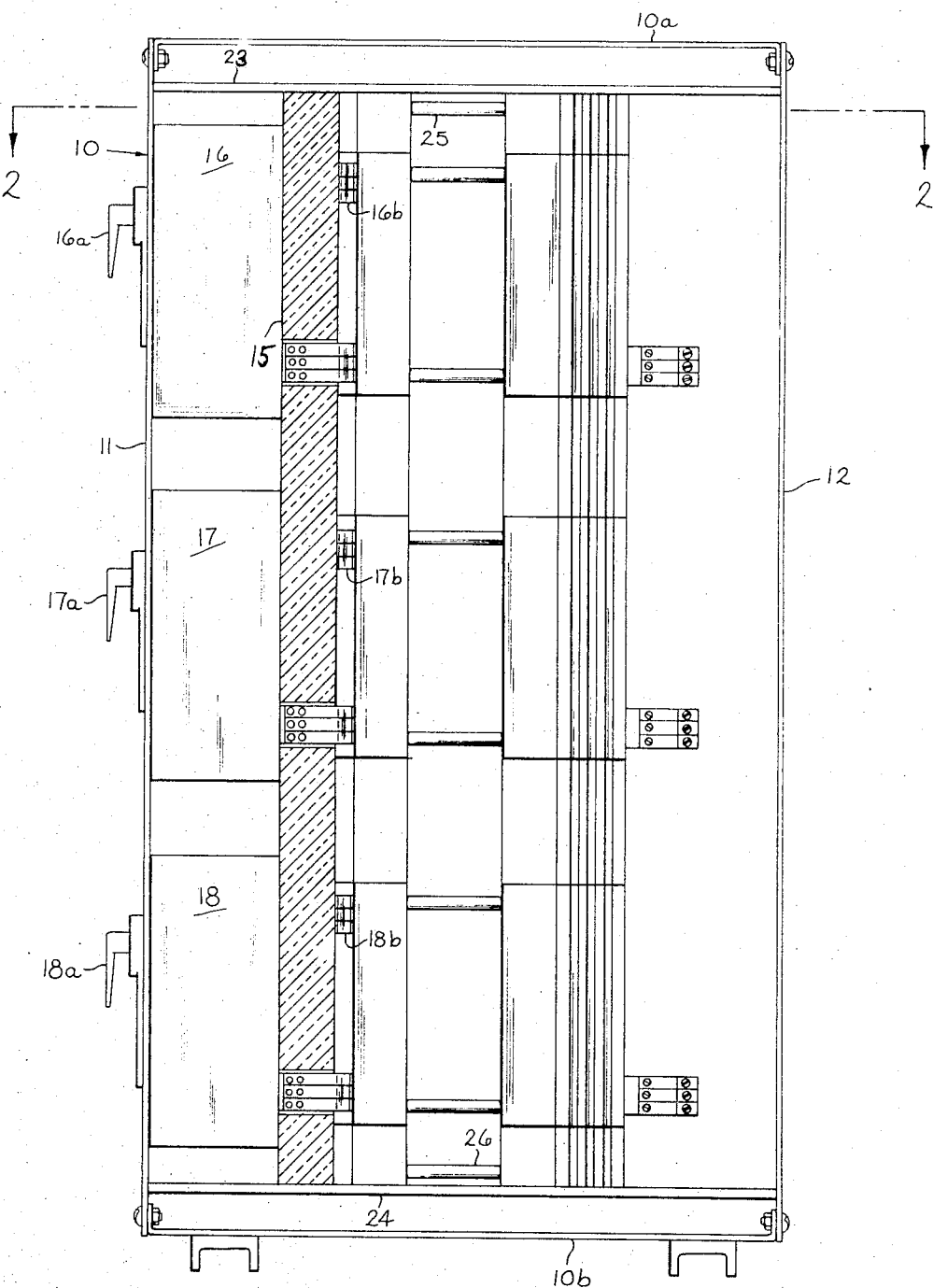
FIG. 1 is a side elevational view of an electric switchboard assembly incorporating the invention, the side wall of the enclosure being removed and broken away for purposes of clarity.
Figure 2:
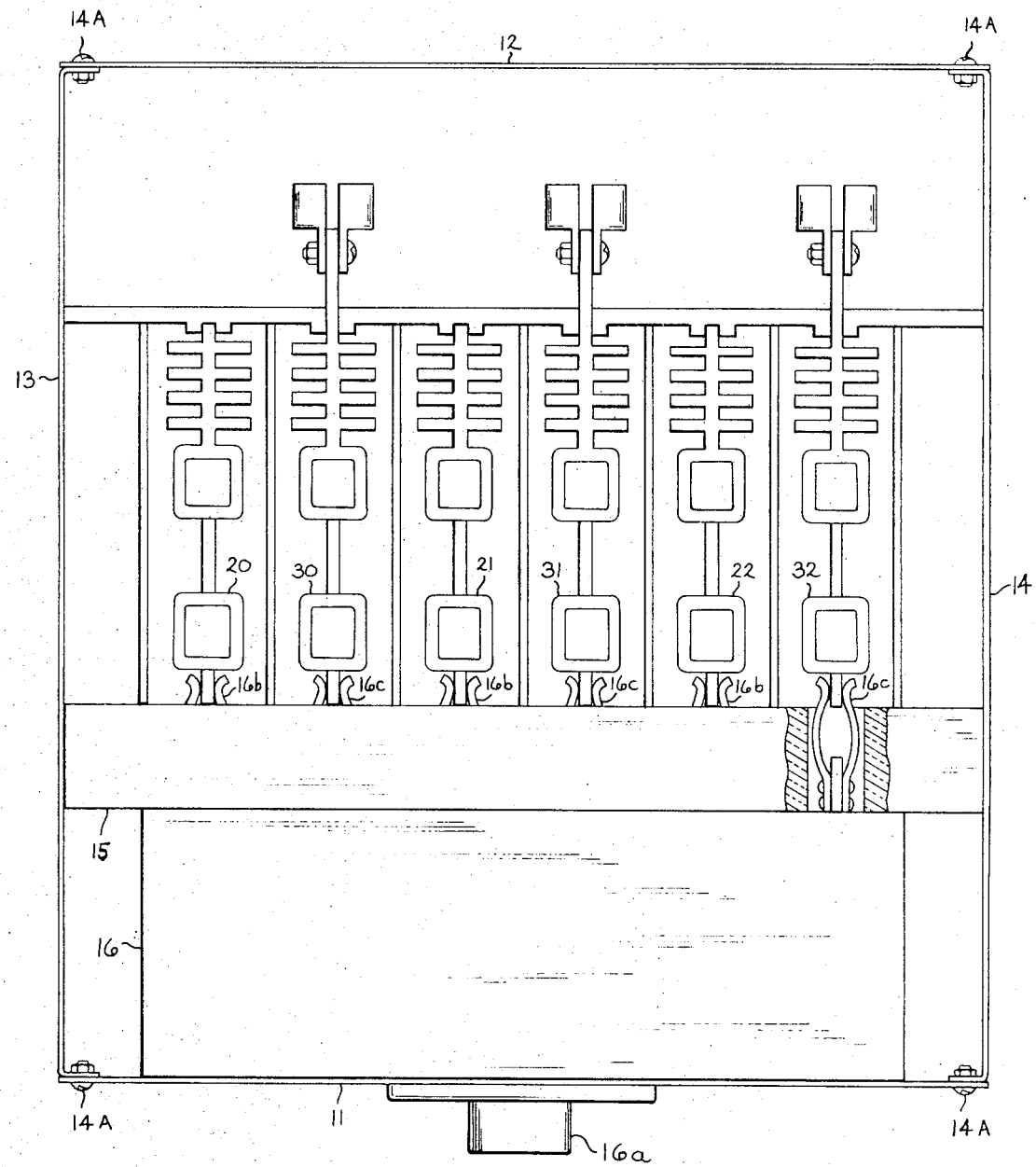
FIG. 2 is a sectional view taken on a plane indicated by the line 2—2 of FIG. 1.

Referring to FIGS. 1 and 2, the invention is shown as incorporated in an electric switchboard assembly including a main generally rectangular enclosure 10 formed of sheet metallic material and including a front plate or wall 11 and a back plate or wall 12 of sheet metal. The front and back walls 11 and 12 are interconnected by opposed side walls 13 and 14 also of sheet metallic material joined to the front and back walls by suitable means such as by bolts 14A.

A sturdy supporting insulating wall 15 is supported between the opposed side walls 13 and 14 in parallel relation to the front wall and spaced therefrom, by suitable mounting means, not shown. A plurality of electrical control devices 16, 17, and 18 are mounted in the switchboard by attachment to the supporting base or wall 15 by suitable means, not shown. Each of the electrical control devices 16, 17, 18 includes an externally accessible handle operating portion 16A, 17A, 18A which projects through a corresponding opening in the front wall 11.

The electric switchboard shown is adapted for use with three phase electrical power, and therefore includes three main power supply busbar assemblies 20, 21, 22 (see FIG. 2), which will be more fully described hereinafter. Each of the electrical control devices 16, 17, 18 includes plug-in type connecting means 16B, 17B, 18B which extend through openings in the insulating supporting wall 17 and into plug-in engagement with a portion of the main power supply busbars 20, 21, 22 as shown in FIG. 2. It will be understood that each of the electrical control devices 16, 17, 18 includes a set of three line terminal connections, as shown in FIG. 2 in connection with the control device 16.

The main enclosure 10 of the switchboard also includes opposed top and bottom wall members 10A and 10B respectively which are joined to the front, back and side walls by suitable means, such as by bolting, not shown. Suitable insulating barriers 23, 24, are provided at the top and bottom of the switchboard assembly as shown in FIG. 1. Ventilation openings, not shown, are provided in the front and back walls 11 and 12 near the bottom and top, and also in the top and bottom walls 10a and 10b to facilitate the flow of air vertically through the switchboard.

Figure 3:
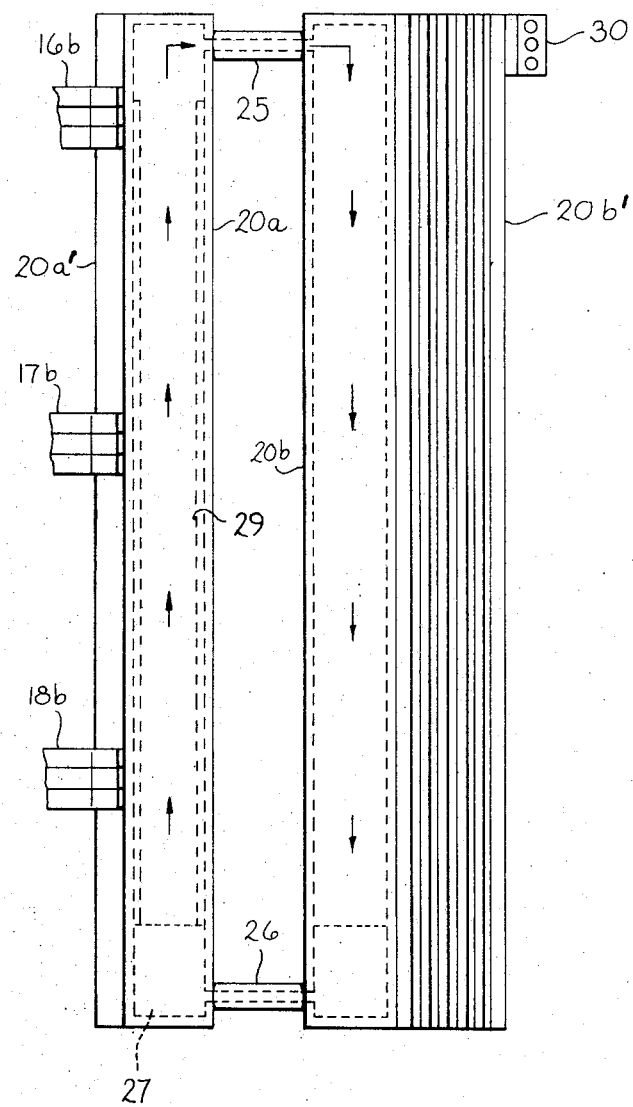
FIG. 3 is a side elevational view of certain parts of another embodiment of the invention.

In FIG. 3 there is shown the line or power input busbar assembly for one of the phrases of the switchboard of FIGS. 1 and 2. Since the power busbar assemblies for each of the three phases are similar, only one will be described in detail. The power busbar assembly shown in FIG. 3 includes a first vertically extending generally tubular portion 20A, having a vertically extending rib portion 20A', onto which the contact jaws of the line terminals of the control devices are plugged, as indicated at 16B, 17B, 18B. Each power busbar assembly also includes a second vertically extending generally tubular portion 20B, having an integral rearwardly extending portion 20B', with outwardly extending fins. The tubular portions 20A and 20B are interconnected at the top and bottom by horizontally extending tubular members 25, 26 respectively, so as to form a closed loop. The interior of the closed loop formed by the vertical member 20A, 20B, and the horizontal members 25, 26, is evacuated or reduced to a low pressure, and a small amount of suitable volatile liquid, such as water, 27 is contained therein. The vertically extending portion 20A also includes a "wick" lining as indicated at 29. The wick 29 may be formed of a material such as woven wire screening material and serves to carry the liquid 27 throughout the vertical length of the portion 20A by capillary action.

In operation, the power input busbar assembly shown in FIG. 3 has power fed to it through terminal means 30 from a suitable power input supply busbar, not shown. The input terminal means 30 may be positioned at the top or bottom of the switchboard, as desired. Electric current therefore flows from the input terminal 30 through the power supply busbar assembly 20A, to the individual control device line terminals such as 16B, 17B, 18B.

Heat generated by current in the busbar assembly, or by current flowing through the contact points and terminals 16B, 17B, 18B, or by current flowing through the control devices, acts to raise the temperature of the portion 20A' of the busbar assembly. This increase of temperature causes water carried by the wick member 29 to be evaporated, absorbing heat. The water vapor fills the entire available space and passes through the horizontally extending tubular connecting portion 25 to the vertically extending portion 20B. The vertically extending busbar portion 20B is relatively cooler than the portion 20A. The water vapor therefore condenses on the side walls of the inner sidewalls of the portion 20B and runs down the walls and collects at the bottom of the loop. Thus a continuous cycle is maintained.

When the water is evaporated in the evaporator busbar portion 20A, it absorbs a relatively large quantity of heat, in accordance with its "heat of vaporization." When the water vapor condenses in the portion 20B, it gives up the heat which it had absorbed on vaporizing. This heat is conducted throughout the portion 20B and is given off by the fins 20B' to the air which circulates by natural convection in the switchboard, assisted by the ventilation openings described above.

In addition to the incoming or power supply busbar assemblies 20, 21, 22, the switchboard assembly of the invention also includes outgoing or load busbar assemblies for each of the control devices 16, 17, 18. Each of the load busbar assemblies for each of the control devices also forms a closed loop heat pipe. It will be understood that each of the control devices 16, 17, 18 is a three-phase power device and has three load terminals, such as the terminals 16C illustrated in FIG. 2 for the control device 16. Thus three load power busbar assemblies are required for each control device 16, 17, 18 and therefore the switchboard assembly illustrated includes nine such load busbar assemblies. Since each such load power busbar assembly is substantially identical to each other such assembly, only one will be described in detail. Accordingly, for the control device 16, three load power busbar assemblies are provided, including vertically extending tubular busbar portions 30, 31, 32, see FIG. 2.

Figure 4:
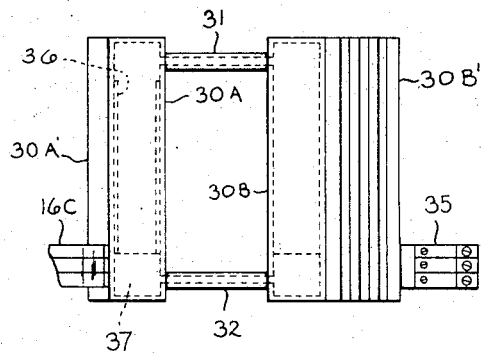
FIG. 4 is a fragmentary view showing a load bus bar assembly in accordance with the invention.

The load power busbar assembly 30 is illustrated in FIG. 4. As shown in FIG. 5, each load power busbar assembly is generally comparable in parts and construction to the line power busbar assemblies, and includes a first vertically extending tubular portion 30A and a second vertically extending tubular portion 30B and horizontally extending tubular portions 31 and 32, forming a closed loop. The portion 30A has a vertically extending rib portion 30A' which receives plug-in type contact jaws 16C of the control device 16. The vertically extending busbar portion 30B has integral rearwardly extending fin portions 30B', and a load terminal connecting lug assembly 35 which is attached to the portion 30B by suitable means, such as by welding or brazing. The portion 30A also includes a wick 36 formed of woven wire material lining its inner surfaces, and a small quantity of water is contained within the assembly as indicated at 37.

The operation of each of the load power busbar assemblies is similar to that described for the line power busbar assemblies. Thus current is conducted through the assembly, entering at the terminals 16C and leaving by the terminals 35. It will be understood, of course, that the horizontally extending tubular members 31 and 32 also conduct electrical current as well as acting to close the heat pipe loop. The vertically extending portion 30A is normally at a higher temperature than the portion 30B because of heat generated by current flowing through it, heat generated at the contact points with the contact jaws 16C, and by heat transmitted through the contact jaws 16C from the control device 16. This increased temperature causes water in the vertically extending portion 30A to evaporate and water vapor to fill the remaining portion of the assembly. The vertically extending portion 30B is normally at a lower temperature than the portion 30A because of its exposure to the air and the increased surface provided by the fins 30B. Accordingly, water vapor condenses in the chamber of the vertical busbar portion 30B, giving up heat, which is dissipated in the naturally circulating air. As previously stated, it will be understood that three load power busbar assemblies such as illustrated in FIG. 4 are required for each of the control devices 16, 17, 18, making a total of nine in the switchboard assembly illustrated.

Figure 5A:
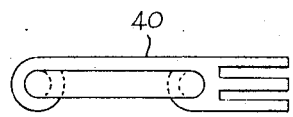
FIGS. 5A and 5B are fragmentary views showing a modified form of bus bar assembly.
Figure 5B:
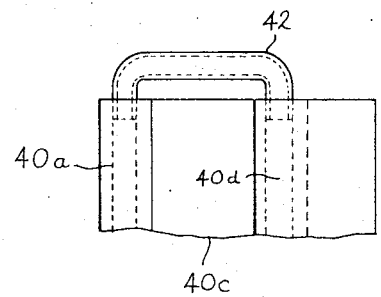

Referring to FIGS. 5A and 5B, a modified form of busbar assembly is shown which is adapted to also form a closed loop type heat pipe assembly. In FIG. 5A the power busbar 40 is shown comprising an extruded shape having two spaced generally tubular portions 40A and 40B interconnected by an integral web portion 40C. The tubular portions 40A, 40D have their openings interconnected by suitable bridging members such as the interconnecting pipe 42 at the top of the assembly, and also at the bottom. Electrical plug-in engagement may be made to one edge of the assembly 40A by suitable contact jaws, not shown, and current may be conducted away from the busbar assembly by suitable terminal means, also not shown, which may be rigidly attached to a suitable point, such as by welding or brazing.

Figure 6:
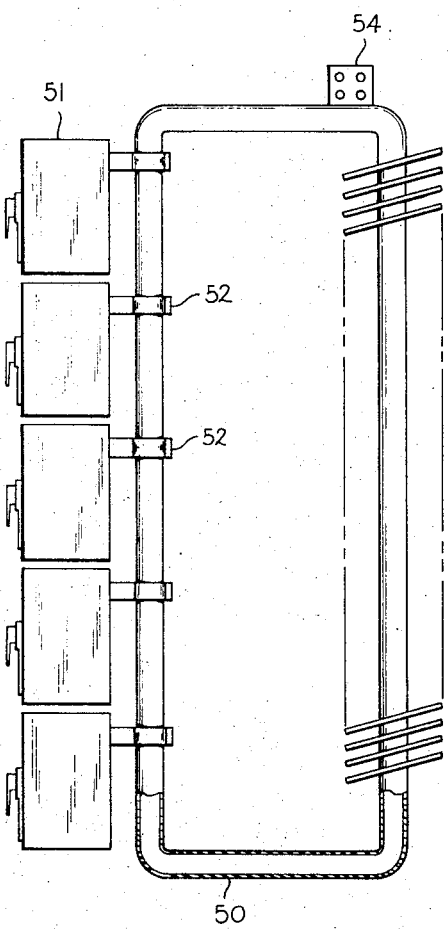
FIG. 6 is an elevational view of a bus bar assembly of a modified form of the invention.

In FIG. 6 another form of the invention is shown comprising a single continuous tubular loop busbar member 50, onto which control devices such as 51 are plugged by clip on type terminals 52. Power may be brought to the bus bar 50 by any convenient means such as by a terminal plate 54 attached to the bus bar 50 such as by welding. Cooling of the right hand portion 50A of the bus bar 50 may be enhanced by the addition of cooling fins 56. While the bus bars have been shown and described as made up of unitary bars, they may, if desired, be made in sections which are joined together to make shorter or larger assemblies.

Numerous other modifications may, of course, be made, and it is therefore intended by the appended claims to cover all such modifications as fall within the true spirit and scope of the invention.

I claim:

1. An electric power switchboard assembly comprising:
   a. a supporting frame;
   b. a plurality of vertically extending power bus bars supported on said frame;
   c. terminal means carried by each of said bus bars for connecting an incoming power conductor thereto;
   d. each of said vertically extending bus bars including first and second longitudinally extending tubular portions;
   e. said first of said longitudinally extending tubular portions including connecting means for electrically connecting at least one electric power takeoff device thereto;
   f. a first passageway interconnecting said first and second tubular portions of each of said bus bars adjacent the upper ends thereof and a second passageway interconnecting said first and second tubular portions of each of said bus bars adjacent the lower ends thereof to form a closed loop passage within said bus bar, and
   g. an evaporable liquid medium contained in said closed loop passage, whereby heat generated in said power take-off devices, in said connecting means, and in said bus bar causes evaporation of said liquid medium in said first tubular portion with absorption of heat and creation of a vapor therein which expands and passes into said second tubular portion through said first passageway where it condenses and gives up heat and collects in liquid form at the lower portion of said second tubular portion and returns as a liquid through said second passageway to said first tubular portion.

2. An electric power switchboard assembly as set forth in claim 1 wherein said second longitudinally extending tubular portion of each of said bus bars includes heat-dissipating fins thereon for facilitating dissipation of heat therefrom.

3. An electric power switchboard assembly as set forth in claim 1 wherein said supporting frame comprises a generally box-like enclosure having front and back, top and bottom, and opposed side walls, said bus bars extending between said top and bottom walls parallel to said front and back walls, and said supporting frame including venting openings for facilitating the flow of air vertically in said switchboard assembly adjacent at least said second longitudinally extending tubular portions of said bus bars.

4. An electric power switchboard assembly as set forth in claim 1 wherein each of said bus bars includes a longitudinally extending web portion interconnecting said first and second tubular portions.

5. An electric power switchboard assembly as set forth in claim 1 wherein said first longitudinally extending tubular portion of each of said bus bars includes a longitudinally extending rib for receiving clamp-type electric connecting means in plug-in engagement therewith.

6. An electric power switchboard assembly as set forth in claim 1 wherein said assembly also includes a second group of bus bars, each of said second group of bus bars comprising spaced front and back vertically extending short tubular sections, said front tubular sections including means for connection to power control devices and said back tubular sections including means for connection to outgoing load conductors, said front and back tubular sections being interconnected at the upper and lower portions thereof by conductive tubular connecting means to form a closed loop having an evaporable liquid therein whereby heat is absorbed from said front section by said liquid as it is transformed from liquid to vapor form and is given up to said back section as said liquid is recondensed.

7. An electric power switchboard assembly as set forth in claim 1 wherein said vertically extending bus bars are each formed of a single continuous pipe-like member having the configuration of a generally rectangular loop shape.

* * * * *